United States Patent
Belinchón Vergara et al.

(10) Patent No.: US 8,559,419 B2
(45) Date of Patent: Oct. 15, 2013

(54) HANDLING OF TERMINATING CALLS FOR A SHARED PUBLIC USER IDENTITY IN AN IP MULTIMEDIA SUBSYSTEM

(75) Inventors: Maria-Carmen Belinchón Vergara, Getafe (ES); Berta Isabel Escribano Bullon, Madrid (ES); Nuria Esteban Vares, Aranjuez (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 290 days.

(21) Appl. No.: 12/994,977

(22) PCT Filed: May 27, 2008

(86) PCT No.: PCT/EP2008/056503
§ 371 (c)(1),
(2), (4) Date: Nov. 29, 2010

(87) PCT Pub. No.: WO2009/143884
PCT Pub. Date: Dec. 3, 2009

(65) Prior Publication Data
US 2011/0075658 A1 Mar. 31, 2011

(51) Int. Cl.
*H04L 12/66* (2006.01)
(52) U.S. Cl.
USPC .......................................................... 370/352
(58) Field of Classification Search
USPC .......................................................... 370/352
See application file for complete search history.

(56) References Cited

U.S. PATENT DOCUMENTS

| | | | |
|---|---|---|---|
| 2008/0045214 A1* | 2/2008 | Wen et al. | 455/435.1 |
| 2008/0123625 A1* | 5/2008 | Buckley | 370/352 |
| 2008/0227451 A1* | 9/2008 | Fukui et al. | 455/435.1 |
| 2010/0050234 A1* | 2/2010 | Lindholm et al. | 726/3 |
| 2010/0177769 A1* | 7/2010 | Barriga et al. | 370/352 |
| 2010/0223339 A1* | 9/2010 | Cheng et al. | 709/206 |
| 2011/0119357 A1* | 5/2011 | Lindholm et al. | 709/220 |

OTHER PUBLICATIONS

3GPP TS 23.228 V8.4.0: "Technical Specification Group Services and System Aspects; IP Multimedia SUbsystem (IMS) ; Stage 2 (Release 8)" 3rd Generation Partnership Project, Mar. 2008, XP002518281.
3GPP TS 29.228 V8.1.0: "IP Multimedia Group Core Network and Terminals: IP Multimedia Subsystem Cx and Dx interfaces; Signalling flows and message contents (Release 8)" 3rd Generation Partnership Project, Mar. 2008, XP002518280.

* cited by examiner

*Primary Examiner* — Luat Phung
*Assistant Examiner* — Najeebuddin Ansari

(57) ABSTRACT

A single IMPI is determined, allowing the progress of a terminating call that addresses a given IMPU shared by more than one IMPI of an IMS subscription. A number of policies are applied per IMPI basis on how to progress the terminating call. A HSS is provided where the policies are configured and, a method is disclosed including IMPU with a number of policies. Additionally, the method may also include a step of configuring at the HSS the more than one IMPI with a priority indication usable to set the order in which the more than one IMPI are checked to determine at least one for which the policies allow to progress the terminating call.

19 Claims, 7 Drawing Sheets

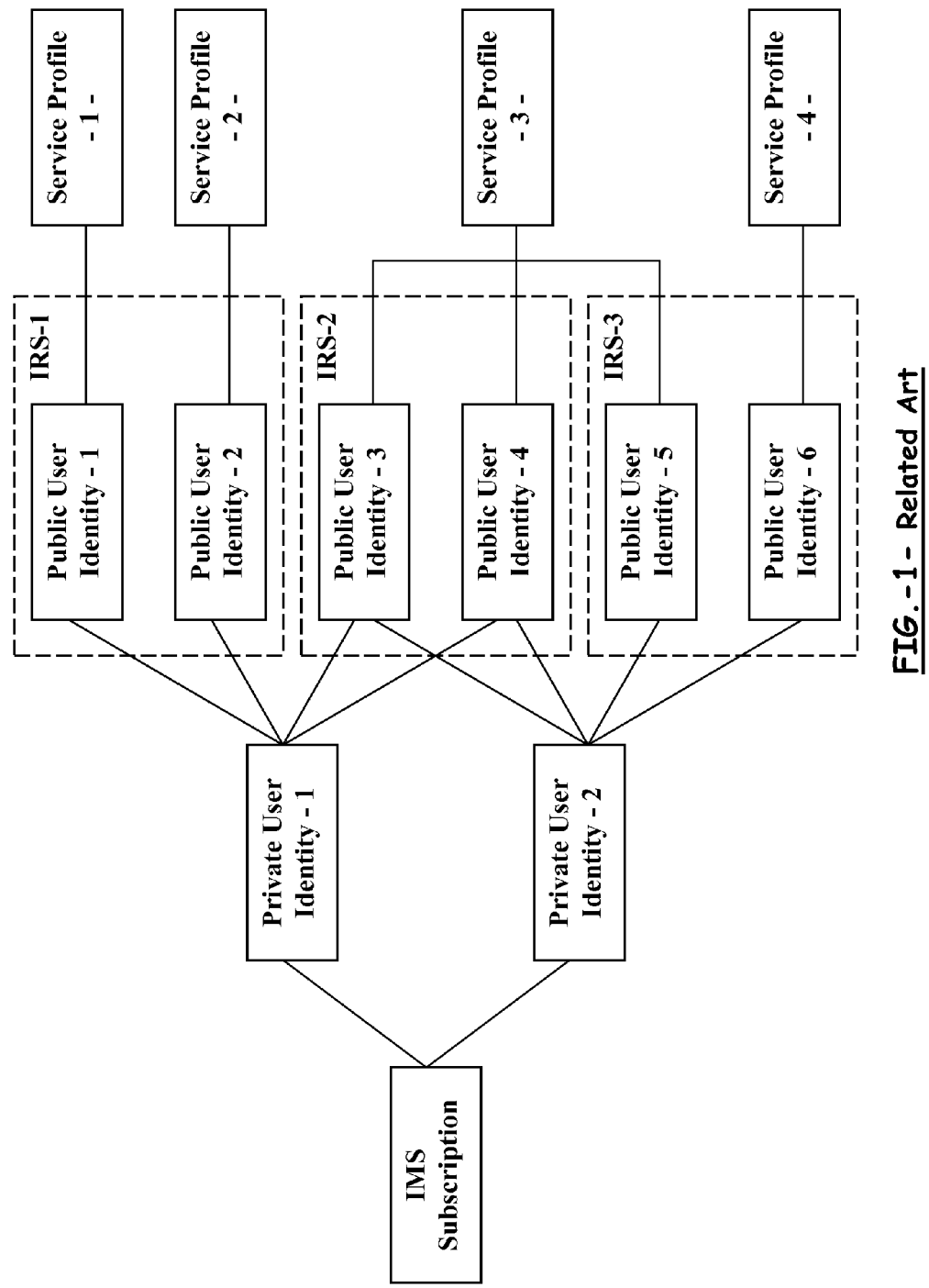
FIG. -1- Related Art

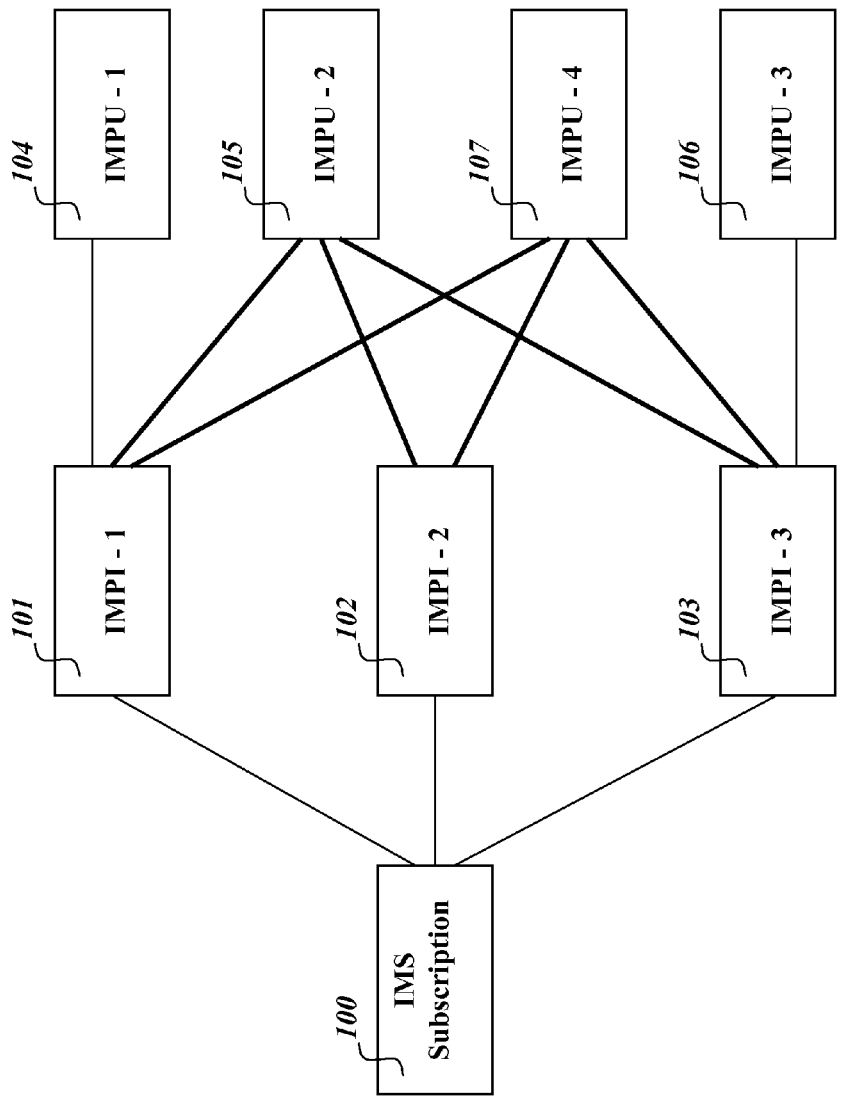
FIG. -2-

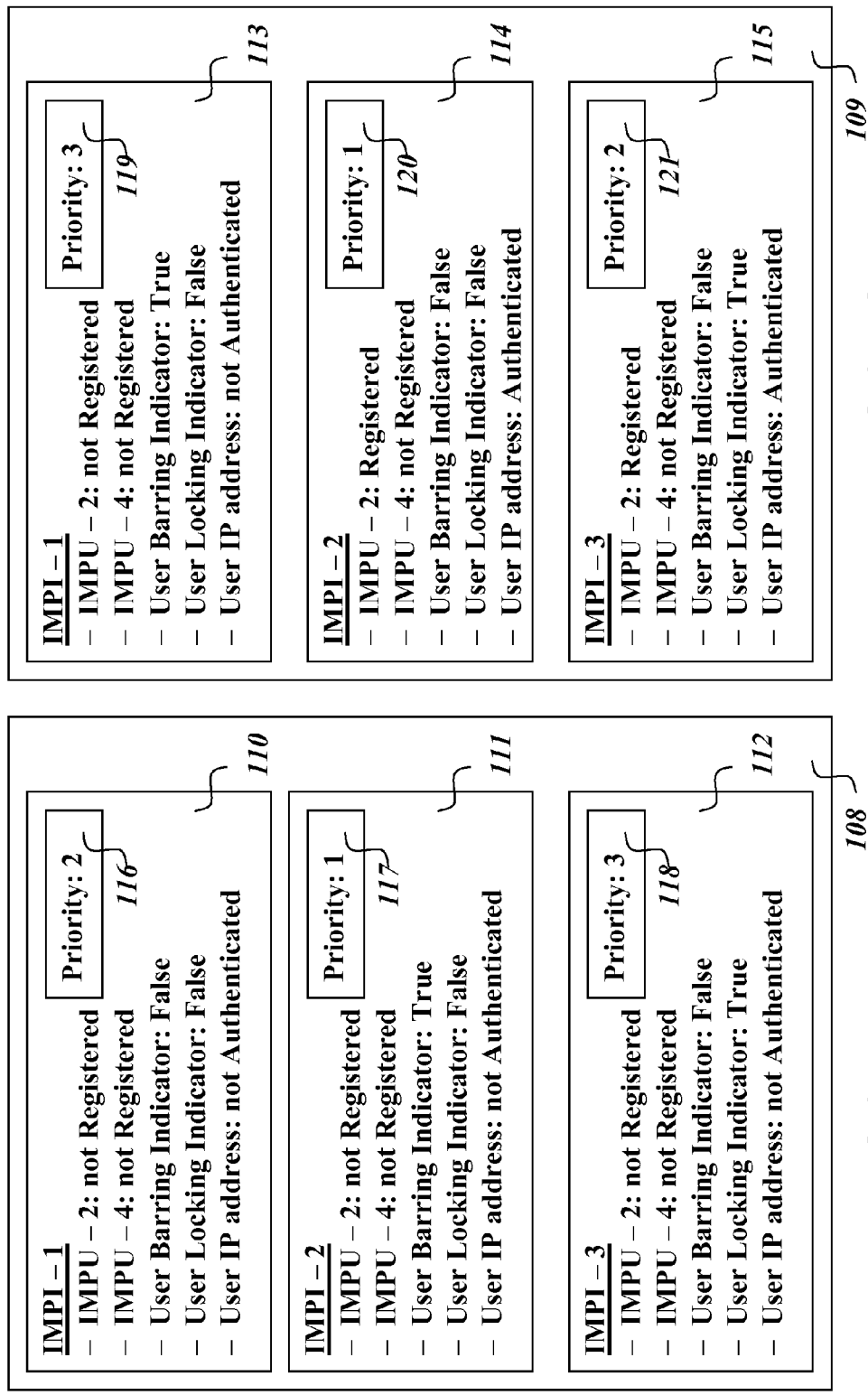

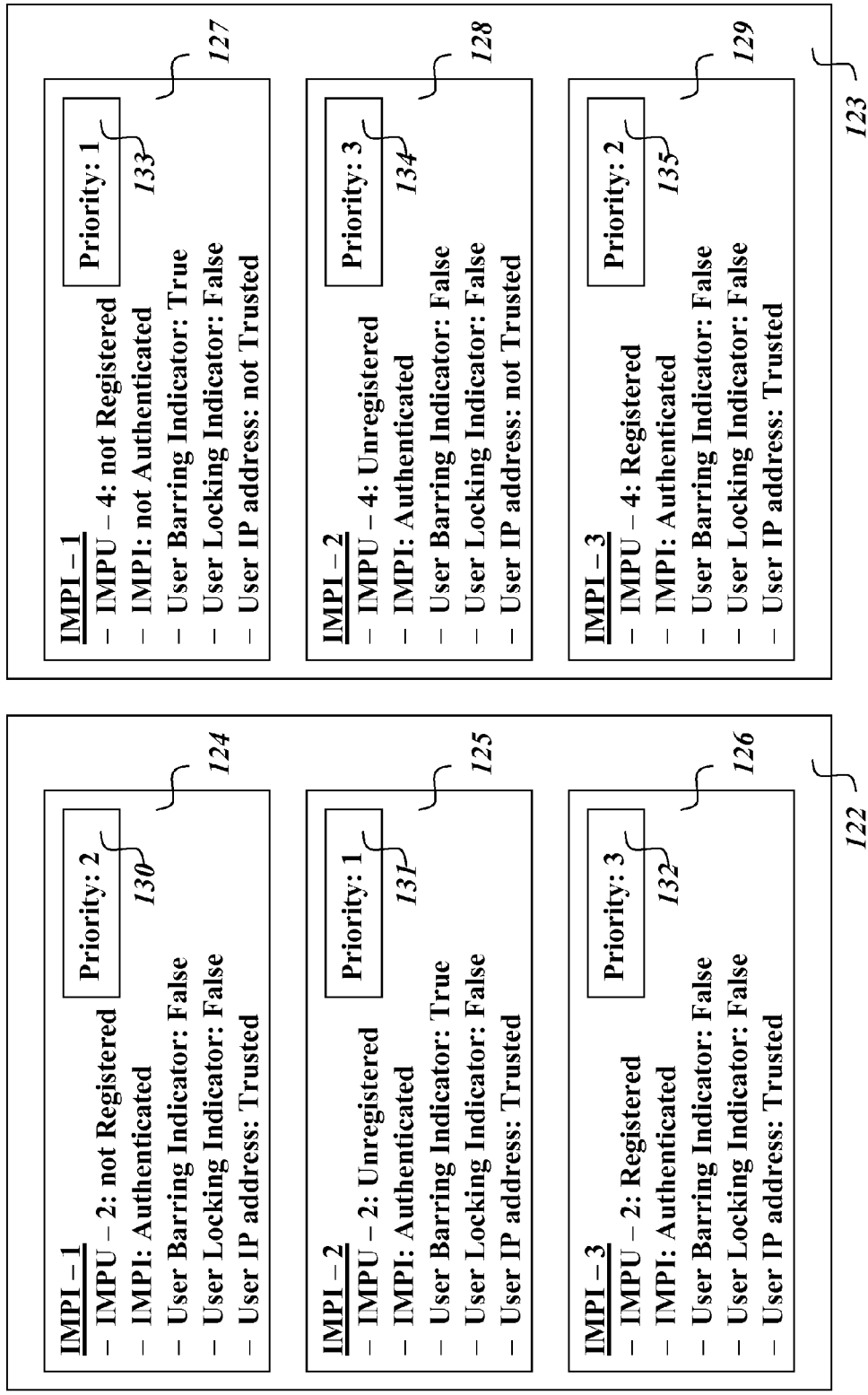

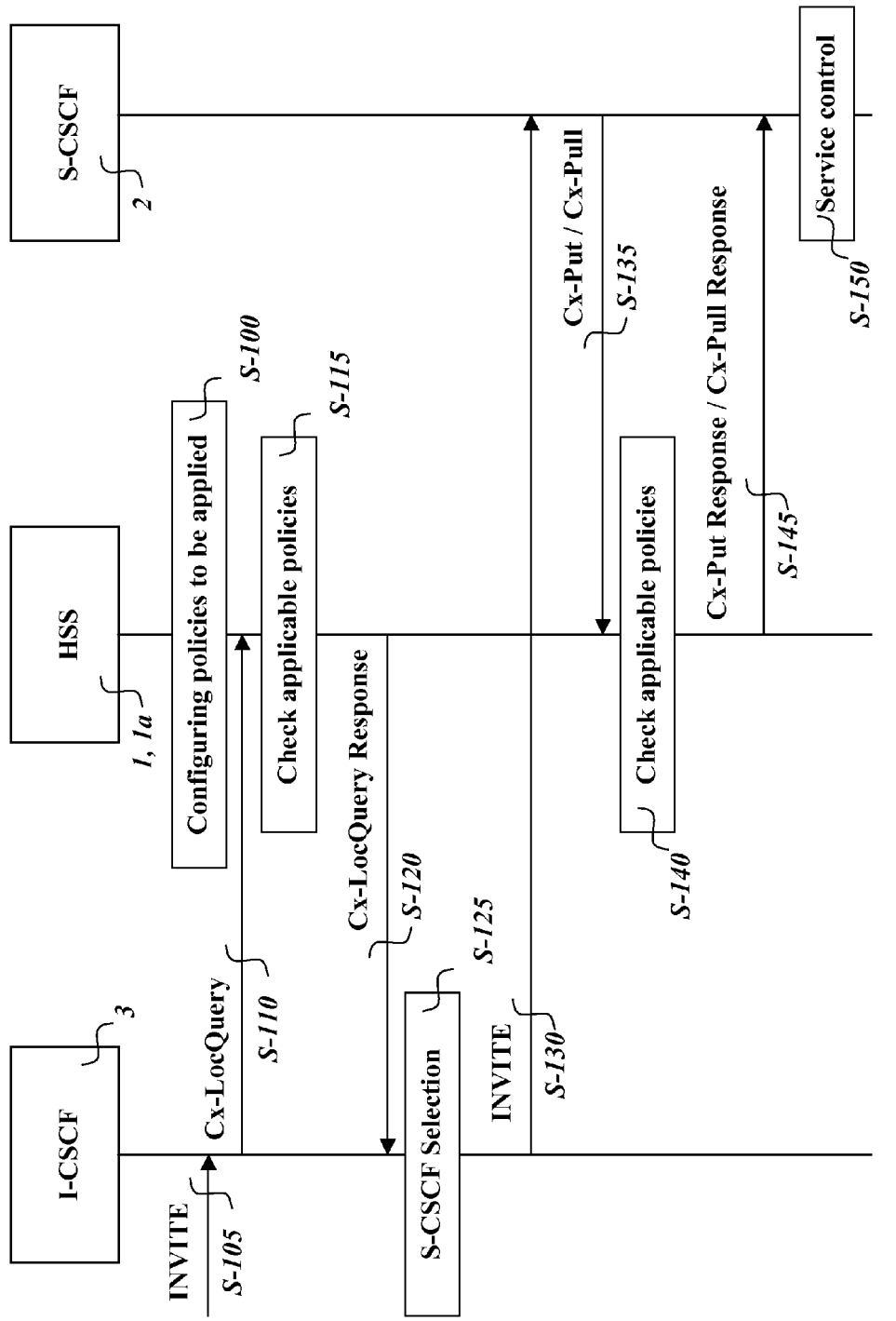
FIG. -5-

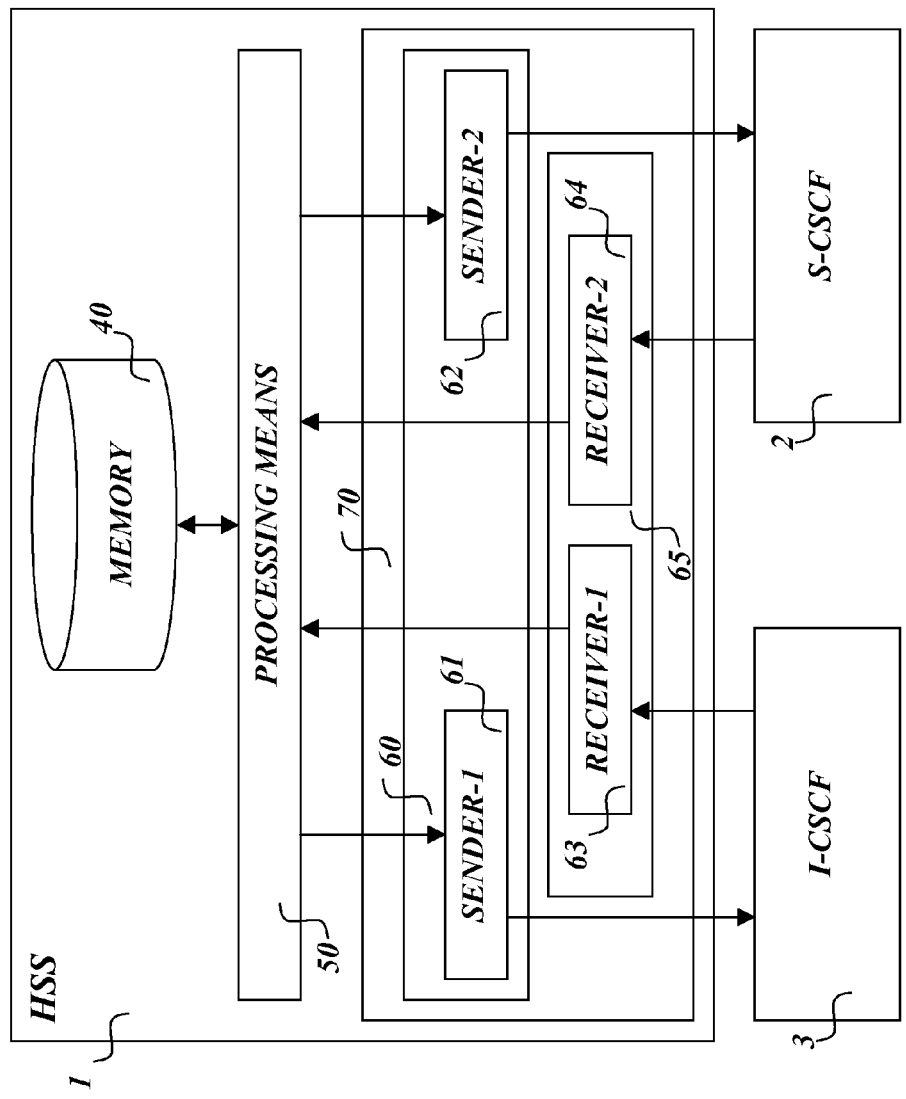
FIG. -6-

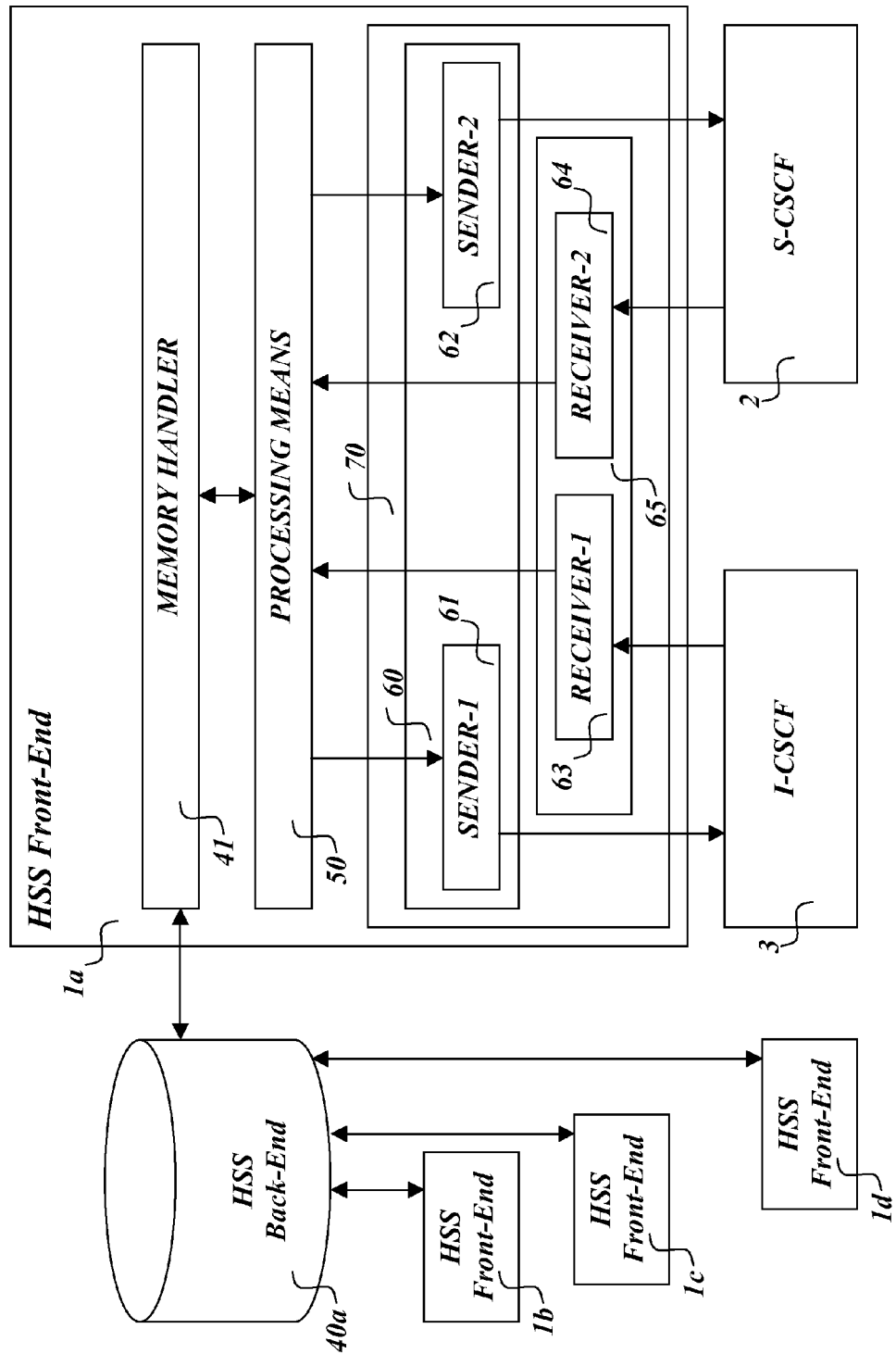
FIG. -7-

HANDLING OF TERMINATING CALLS FOR A SHARED PUBLIC USER IDENTITY IN AN IP MULTIMEDIA SUBSYSTEM

TECHNICAL FIELD

The present invention generally relates to the handling of terminating calls in an IP Multimedia Subsystem. More particularly, the invention pertains to means and method for handling in the IP Multimedia Subsystem a terminating call addressing a given Public User Identity, where the given Public User Identity is shared by more than one Private User Identity and where a number of policies are configured to be applied per Private User Identity basis.

BACKGROUND

3GPP defines an IP Multimedia Subsystem and, more specifically, the IP Multimedia Core Network Subsystem to enable support for IP multimedia applications. For the sake of simplicity, and since the IP Multimedia Subsystem is defined by 3GPP as being access-independent, all references are made throughout this specification to the IP Multimedia Subsystem (hereinafter IMS).

According to 3GPP, a user may register into the IMS network or receive a terminating call to experience IMS services. To this end, such user must be given a subscription to the IMS.

A user with an IMS subscription is given one or more Private User Identities. An IMS Private user Identity (hereinafter IMPI) is assigned by the home network operator, and is used for Registration, that is, for Authorization and Authentication into the IMS network. A user may also have one or more Public User Identities. An IMS Public User identity (hereinafter IMPU) is used by any user as a user's identifier for communications with other users.

Generally speaking, any IMPU of an IMS subscription may be shared by more than one IMPI within the same IMS subscription. In particular, an IMPU may be shared amongst all the IMPI's of an IMS subscription as stated in 3GPP TS 23.228. This feature is called IMPU sharing, and such IMPU is generally known under 3GPP as a 'shared IMPU'.

In this respect, FIG. 1 illustrates an exemplary IMS subscription in accordance with 3GPP, wherein "Public User Identity—3" and "Public User Identity—4" are both shared by all the IMPI's of the IMS subscription, namely "Private User Identity—1" and "Private User Identity—2", and are thus both considered 'shared IMPU's'.

On the one hand, an IMS subscriber may register into the IMS network with an IMPI/IMPU pair selected by the IMS subscriber amongst those IMPI's and IMPU's associated in the IMS subscription of the IMS subscriber. The IMS subscriber thus registers into the IMS with a 'Register' message of a Session Initiation Protocol (hereinafter SIP) as defined by 3GPP and including a selected IMPU/IMPI pair.

A conventional registration process includes the submission of a 'SIP Register' message from the IMS subscriber towards a so-called Proxy Call Session Control Function server (hereinafter P-CSCF), which forwards such message towards an Interrogating Call Session Control Function server (hereinafter I-CSCF) of the IMS network where the destination subscriber belongs. The I-CSCF is in charge of selecting an appropriate Serving Call Session Control Function server (hereinafter S-CSCF) for serving the IMS subscriber, and queries a Home Subscriber Server (hereinafter HSS) in charge of subscription data for subscribers of the IMS network where the IMS subscriber belongs to. Assuming that the IMS subscriber had not previously registered the IMPI/IMPU pair, the HSS returns the capabilities required for an S-CSCF to be assigned for serving the IMS subscriber. The I-CSCF receiving such capabilities selects an appropriate S-CSCF fulfilling the capabilities, and forwards the 'SIP Register' message with the IMPI/IMPU pair thereto. The S-CSCF receiving the 'SIP Register' message submits its own registration towards the HSS to indicate it has been assigned for serving the subscriber identified by the IMPI/IMPU pair. The HSS then changes the status of said IMPI and IMPU from 'not registered' to 'registered', stores a reference to the S-CSCF as being assigned for serving the IMS subscriber, and downloads a user profile associated to said IMPU towards the S-CSCF. The S-CSCF receiving the user profile for the IMS subscriber is now ready for serving the IMS subscriber.

On the other hand, a terminating call received in an IMS network of the destination subscriber does not include any IMPI but just a given IMPU of the destination subscriber selected by the call originating subscriber. Such given IMPU might have previously been registered, in which case it would be marked as 'registered' in the HSS; or not registered at all, in which case it would be marked as 'not registered' in the HSS; or not registered as a result of the registration process explained above but having received a previous terminating call, in which case it would be marked as 'unregistered' in the HSS Conventionally, a terminating call is received at an I-CSCF of the IMS network where the destination subscriber belongs to and includes an IMPU identifying the destination IMS subscriber. Upon receipt of the terminating call, with an 'Invite' message of a Session Initiation Protocol (hereinafter SIP) as defined by 3GPP, a query is submitted from the I-CSCF towards the HSS in charge of subscription data for subscribers of the IMS network where the destination IMS subscriber belongs to. The HSS answers such query either with the required capabilities of an assignable S-CSCF (where the IMPU is 'not registered' and no S-CSCF is assigned to the IMPU), or with an identifier of a previously assigned S-CSCF (where the IMPU is in 'registered' or 'unregistered' state). Depending on the submission received, the I-CSCF either selects an assignable S-CSCF fulfilling the capabilities or newly assigns the previously assigned S-CSCF, and forwards the 'SIP Invite' message thereto. If such S-CSCF receiving the 'SIP Invite' message had already downloaded a user profile associated to said IMPU, the S-CSCF progresses the call in accordance with existing procedures. Otherwise, the S-CSCF receiving the 'SIP Invite' registers itself as been assigned for serving the IMS subscriber towards the HSS and includes the given IMPU addressed in the terminating call but no IMPI. The HSS, aware of being a terminating call, changes the status of the given IMPU from 'not registered' to 'unregistered' (unless the given IMPU was already in an 'unregistered' status as a result of a previous terminating call addressing such IMPU), stores a reference to the S-CSCF as being assigned for serving the IMS subscriber, and determines a user profile associated to the given IMPU to be downloaded towards the assigned S-CSCF. Apart from that, where the given IMPU is associated with only one single IMPI, the HSS may include this single IMPI to be downloaded towards the assigned S-CSCF.

However, where the given IMPU is a shared IMPU associated with all the IMPI's in the IMS subscription, the HSS cannot determine a single IMPI to built up an IMPI/IMPU pair related to the terminating call. The HSS can only follow the 3GPP technical specifications, whereby an arbitrary IMPI might be selected, or alternatively all the IMPI's of the IMS subscription being returned.

This approach is very inefficient since more granularity per IMPI basis is a continuous demand by operators of IMS networks, whereby other criteria than simply selecting an arbitrary IMPI or selecting all the IMPI's of the IMS subscription are taken into account where the given IMPU in a terminating call is a shared IMPU of the IMS subscription.

SUMMARY

The present invention is aimed to obviate at least some of the above disadvantages and provides for a new method and an enhanced HSS to allow a higher granularity per user than the approach offered by the standard, as demanded by operators, even where the given IMPU in a terminating call is a shared IMPU associated with a plurality of IMPI's in the IMS subscription. The aim of the invention is to allow, inasmuch as possible, to progress the call. To achieve this, the present invention proposes the provision of a number of policies to be applied per IMPI basis.

In accordance with a first aspect of the present invention, there is provided a new method of progressing a terminating call in the IMS, wherein the terminating call addresses a given IMPU which is shared amongst more than one IMPI of an IMS subscription.

This method comprises the steps of: configuring at the HSS said more than one IMPI sharing the given IMPU with a number of policies to be applied per IMPI on how to progress the terminating call; receiving at the HSS from an I-CSCF a query about a subscriber identified by the given IMPU; determining at the HSS amongst said more than one IMPI sharing the given IMPU at least one IMPI for which the policies allow to progress the terminating call; and, where the at least one IMPI is found, answering from the HSS either capabilities required from an assignable S-CSCF, or an identifier of a previously assigned S-CSCF. In particular, capabilities are returned where the given IMPU is in a state 'not registered' and no S-CSCF had been assigned to the given IMPU, whilst an identifier of a previously assigned S-CSCF is returned where the given IMPU is in a state 'registered' or 'unregistered'. Generally speaking, an IMPU is in a state 'unregistered' where such IMPU had been registered as a result of a previously terminating call and has services related to such event or, in other words, where there is an S-CSCF already keeping the user profile stored.

Where no IMPI is found for which the policies allow to progress the terminating call, the HSS answers towards the I-CSCF with an error condition to avoid an interim progress of the call.

Where an S-CSCF is assigned and requires a user profile for the given IMPU, such as the case may be where the given IMPU is in a state 'not registered', the method may further comprise a step of receiving at the HSS a registration from the S-CSCF assigned to handle the terminating call; a step of determining at the HSS amongst said more than one IMPI sharing the given IMPU at least one IMPI for which the policies allow to progress the terminating call; and, where the at least one IMPU is found, a step of downloading a user profile for the given IMPU from the HSS towards the assigned S-CSCF currently handling the terminating call.

In order to reduce the processing time at the S-CSCF, amongst other purposes, this method may further include a step of submitting from the HSS towards the assigned S-CSCF the at least one IMPI for which the policies allow to progress the terminating call. Preferably, the at least one IMPI for which the policies allow to progress the terminating call may be submitted towards the S-CSCF along with, or included in, the user profile.

However, where the given IMPU is shared by a plurality of IMPI's of the IMS subscription and where the policies are provided with a high granularity and include a high number of parameters to be checked, there may be difficulties to apply the above policies per IMPI basis, especially since these policies per IMPI might be contradictory if all are applied.

To solve this drawback, the method is enhanced by further comprising a step of configuring at the HSS said more than one IMPI sharing the given IMPU with a priority indication usable to set the order in which said more than one IMPI are checked to determine those IMPI's for which the policies allow to progress the terminating call. Where the priority indication is used, the above step of determining at the HSS the at least one IMPI for which the policies allow to progress the terminating call may be carried out until a first IMPI is found for which the policies allow to progress the call. In particular, where the at least one IMPI is submitted towards the S-CSCF, only the first IMPI found is submitted towards the S-CSCF.

In particular, the step of determining at the HSS the at least one IMPI for which the policies allow to progress the terminating call may be carried out upon receipt at the HSS from the I-CSCF the query about a subscriber identified by the given IMPU, or upon receipt at the HSS from the S-CSCF the request of a user profile for the given IMPU. Generally speaking, the policies to be applied may comprise at least one criterion selected from a group of criteria including: whether each IMPI is or not authenticated; whether each assigned IP address is or not trusted; whether each IMPI is or not blocked; and whether each IMPI is or not barred.

Regarding the configuration of policies at the HSS, the priority indications may be configured per IMS subscription basis, or per shared IMPU basis. Apart from that, additional advantages may be obtained where a subset of the policies to be applied may be dynamically updated, whilst others remain static after configuration.

On the other hand, said more than one IMPI sharing the given IMPU may be all the IMPI's of the IMS subscription or just a subset of them.

In accordance with a second aspect of the present invention, there is provided a new HSS for holding subscriptions for subscribers of the IMS and arranged to be configured with a number of policies to be applied per IMPI basis on how to progress a terminating call.

This HSS comprises: an accessible storage for storing IMS subscription data for each IMS subscriber, the IMS subscription data including a number 'n' of IMPI's and a number 'm' of IMPU's, wherein a given IMPU is shared amongst more than one IMPI; a first receiver for receiving from an I-CSCF a query about a subscriber identified by the given IMPU; processing means for determining whether an S-CSCF had previously been assigned for the given IMPU; a first sender for answering the query towards the I-CSCF with either capabilities required from an assignable S-CSCF, or an identifier of a previously assigned S-CSCF; and wherein the accessible storage of this HSS is arranged for configuring said more than one IMPI sharing the given IMPU with a number of policies to be applied on how to progress the terminating call; and wherein the processing means of this HSS is arranged for determining amongst said more than one IMPI sharing the given IMPU at least one IMPI for which the policies allow to progress the terminating call and, where the at least one IMPI is found, for enabling the first sender to answer the query towards the I-CSCF with either the capabilities required from an assignable S-CSCF, or the identifier of a previously assigned S-CSCF. Where no IMPI is found for which the policies allow to progress the terminating call, the first sender is enabled to return an error condition to avoid an interim progress of the call.

In particular, capabilities are returned where the given IMPU is in a state 'not registered' and no S-CSCF had been assigned to the given IMPU, whilst an identifier of a previously assigned S-CSCF may be returned where the given IMPU is in a state 'registered' or 'unregistered'.

As for the above method, where the assigned S-CSCF requires a user profile for the given IMPU, the HSS may further comprise a second receiver for receiving a registration from the S-CSCF assigned to handle a terminating call for the subscriber identified by the given IMPU; a second sender for downloading the user profile towards the assigned S-CSCF currently handling the terminating call; and the processing means of the HSS may be arranged for determining amongst said more than one IMPI sharing the given IMPU at least one IMPI for which the policies allow to progress the terminating call, before downloading the user profile towards the S-CSCF. Where no IMPI is found for which the policies allow to progress the terminating call, the second sender is enabled to return an error condition instead of downloading the user profile in order to avoid an interim progress of the call. Aligned with the above method, the second sender of the HSS may be arranged for submitting the at least one IMPI for which the policies allow to progress the terminating call towards the assigned S-CSCF. Moreover, the second sender may be arranged for submitting the at least one IMPI towards the S-CSCF along with, or included in, the user profile.

Different alternatives may be offered for implementation of this HSS without substantially departing from the main object of the invention. For instance, the first and second receivers may be implemented with a unique receiver, the first and second senders may be implemented with a unique sender, or all receivers and senders may be implemented with a unique input/output unit.

As for the above method, and in order to solve the difficulties to apply the above policies on IMPI basis, especially where these policies per IMPI might be contradictory if all are applied, the accessible storage of this HSS may be arranged for configuring said more than one IMPI sharing the given IMPU with a priority indication usable to set the order in which said more than one IMPI is checked to determine those IMPI's for which the policies allow to progress the terminating call. Where this is the case, the processing means may further be arranged for checking the IMPI's until a first IMPI is found for which the policies allow to progress the call. Moreover, the second sender may further be arranged for submitting towards the S-CSCF only said first IMPI found. Alternatively, the accessible storage of this HSS may be arranged for configuring the priority indications per IMS subscription basis, or per shared IMPU basis.

In particular, the accessible storage in this HSS may be arranged for configuring said more than one IMPI sharing the given IMPU with a number of policies that comprise at least one criterion selected from: whether each IMPI is or not authenticated; whether each assigned IP address is or not trusted; whether each IMPI is or not blocked; and whether each IMPI is or not barred.

Regarding the accessible storage in this HSS, also different alternatives may be offered for implementation of this HSS without substantially departing from the main object of the invention. For instance, the accessible storage may include an external database acting as an HSS back-end shared by a plurality of HSS front-ends, and a memory handler for interfacing with the external database. Alternatively, the accessible storage may be an internal memory integrated into the HSS.

On the other hand, the invention may be practised by a computer program, in accordance with a third aspect of the invention, the computer program being loadable into an internal memory of a computer with input and output units as well as with a processing unit, and comprising executable code adapted to carry out the above method steps. In particular, this executable code may be recorded in a carrier readable in the computer.

BRIEF DESCRIPTION OF THE DRAWINGS

The features, objects and advantages of the invention will become apparent by reading this description in conjunction with the accompanying drawings, in which:

FIG. 1 basically represents a conventional model of an IMS subscription, in respect of user identities and their relationships, as defined by 3GPP.

FIG. 2 shows a simplified view of an exemplary IMS subscription to better describe embodiments of the invention.

FIG. 3A and FIG. 3B show an exemplary updating of policies to be applied per IMPI basis on how to progress a terminating call, wherein the policies illustrated in FIG. 3A are configured per IMS subscription basis and are dynamically updated to adopt the values illustrated in FIG. 3B.

FIG. 4A and FIG. 4B show two exemplary policies to be applied per IMPI basis on how to progress a terminating call, wherein said policies are configured per shared IMPU basis.

FIG. 5 illustrates a simplified view of the sequence of actions to be performed to carry out a method of handling a terminating call, where both I-CSCF and S-CSCF trigger the checking of policies per IMPI at the HSS, in accordance with an aspect of the invention.

FIG. 6 illustrates an exemplary implementation of a HSS provided for handling a terminating call in accordance with an aspect of the invention, wherein the accessible storage is provided by an external database acting as an HSS back-end shared by a plurality of HSS front-ends.

FIG. 7 illustrates an exemplary implementation of a HSS provided for handling a terminating call in accordance with an aspect of the invention, wherein the accessible storage is provided by an internal memory integrated into the HSS.

DETAILED DESCRIPTION

The following describes currently preferred embodiments of means and method for handling a terminating call addressing a shared IMPU of an IMS subscription.

FIG. 2 illustrates an exemplary IMS subscription 100 for a subscriber of an IMS network, the IMS subscription including a first IMPI 101, a second IMPI 102 and a third IMPI 103 as well as a first IMPU 104, a second IMPU 105, a third IMPU 106 and a fourth IMPU 107. In this exemplary IMS subscription the first IMPU 104 is uniquely associated with the first IMPI 101, the third IMPU 106 is uniquely associated with the third IMPI 103, whereas the second IMPU 105 and the fourth IMPU 107 are shared by all the IMPI's of the IMS subscription. These second IMPU 105 and fourth IMPU 107 are considered shared IMPU's in accordance with the 3GPP definition.

In accordance with the invention, a number of policies are configured to be applied per IMPI basis on how to progress a terminating call. For the purpose of the present invention, only those policies affecting the shared IMPU's, namely the second IMPU 105 and the fourth IMPU 107, are relevant for this discussion.

FIG. 3A illustrates a first exemplary set of policies 108 configured per IMS subscription basis and which comprises policies 110 to be applied for the first IMPI 101, policies 111 to be applied for the second IMPI 102, and policies 112 to be applied for the third IMPI 103. In this exemplary set, the second IMPU 105 and the fourth IMPU 107 are considered 'not registered' since they were not registered with any of the IMPI's; whereas IMPI-2 102 is marked with the highest priority indication 117 set to value '1', IMPI-1 101 is marked with the next priority indication 116 set to value '2' and IMPI-3 103 is marked with the lower priority indication 118 set to value '3'.

On the other hand, since at least some subset of the policies may dynamically be updated during operation, FIG. 3B illustrates a second exemplary set of policies 109 also configured per IMS subscription basis and which comprises policies 113 to be applied for the first IMPI 101, policies 114 to be applied for the second IMPI 102, and policies 115 to be applied for the third IMPI 103. In this exemplary set, which may correspond to an updating of the set illustrated in FIG. 3A during operation, the second IMPU 105 is considered 'registered' for the second IMPI 102 and for the third IMPI 103, and is considered 'not registered' for the first IMPI 101, whilst the fourth IMPU 107 is considered 'not registered' since it was not registered with any of the IMPI's. Moreover, in this exemplary set IMPI-2 102 is marked with the highest priority indication 120 set to value '1', IMPI-3 103 is marked with the next priority indication 121 set to value '2' and IMPI-1 101 is marked with the lower priority indication 119 set to value '3'.

Apart from that, FIG. 4A and FIG. 4B respectively illustrates exemplary sets of policies 122 and 123 configured per shared IMPU basis. In this respect, FIG. 4A illustrates an exemplary set of policies 122 configured for IMPU-2 105 and comprising policies 124 to be applied for the first IMPI 101, policies 125 to be applied for the second IMPI 102, and policies 126 to be applied for the third IMPI 103. In this exemplary set, the IMPU-2 105 is considered 'not registered' for IMPI-1 101, 'unregistered' for IMPI-2 102 and 'registered' for IMPI-3 103, whereas IMPI-2 102 is marked with the highest priority indication 131 set to value '1', IMPI-1 101 is marked with the next priority indication 130 set to value '2' and IMPI-3 103 is marked with the lower priority indication 132 set to value '3'.

On the other hand, FIG. 4B illustrates an exemplary set of policies 123 configured for IMPU-4 107 and comprising policies 127 to be applied for the first IMPI 101, policies 128 to be applied for the second IMPI 102, and policies 129 to be applied for the third IMPI 103. In this exemplary set, the IMPU-4 107 is considered 'not registered' for IMPI-1 101, 'unregistered' for IMPI-2 102 and 'registered' for IMPI-3 103; whereas IMPI-1 101 is marked with the highest priority indication 133 set to value '1', IMPI-3 103 is marked with the next priority indication 135 set to value '2' and IMPI-2 102 is marked with the lower priority indication 134 set to value '3'.

In operation, where there is a terminating call addressing a shared IMPU, such as IMPU-2 105 or IMPU-4 107 may be in accordance with the exemplary IMS subscription 100 illustrated in FIG. 2, the method illustrated in FIG. 5 may be followed to progress the terminating call in the IMS.

As illustrated in FIG. 5, this method starts with a step S-100 of configuring at the HSS the one or more IMPI sharing a number of IMPU's with a number of policies to be applied per IMPI on how to progress the terminating call. In particular, where priorities are applied to policies and the priorities are configured per IMS subscription, one may assume the configuration of the exemplary set illustrated in FIG. 3A to better understand the following actions carried out at different steps of this method. Generally speaking, the registration state of a certain IMPU is not necessarily part of the policies since it rather corresponds to a dynamic parameter value which is traditionally started as 'not registered'. Nevertheless, it has been depicted in corresponding drawings for the sake of simplicity to see in just one view all the parameters that can be taken into consideration as analysing the policies to be applied per IMPI.

Alternatively, one may assume as well the configuration of the exemplary sets illustrated in FIG. 4A and FIG. 4B, where priorities are applied to policies and the priorities are configured per shared IMPU basis. If this is the case, one may assume the exemplary set of policies illustrated in FIG. 4A as applying to the shared IMPU-2 105 as well as the exemplary set of policies illustrated in FIG. 4B as applying to the shared IMPU-4 107, where the priorities apply per shared IMPU basis. As for the alternative illustrated in FIG. 3A, the registration state of IMPU-2 or IMPU-4 is not necessarily part of the policies though it has been depicted in corresponding drawings for the sake of simplicity to see in just one view all the parameters that can be taken into consideration as analysing the policies to be applied per IMPI.

The method illustrated in FIG. 5 thus continues where a terminating call addressing a shared IMPU 105 or 107 is received in the IMS network holding an IMS subscription for a subscriber with said shared IMPU. To this end, an invitation to hold the terminating call is received during a step S-105 at an I-CSCF 3 of said IMS network.

The receiver I-CSCF 3 submits then a query towards an HSS 1 holding IMS subscriptions for subscribers of the IMS network, or towards an HSS front-end 1a having an accessible centralized database with which to conform a whole HSS, to inquire about a subscriber identified by the given shared IMPU 105 or 107. The HSS receiving such query then checks during a step S-115 the applicable policies for the given shared IMPU 105 or 107.

Where the given shared IMPU is IMPU-2 105 and the policies 108 illustrated in FIG. 3A had been configured and not updated yet during operation, the HSS 1 or 1a finds out that such given IMPU-2 is not registered for any IMPI and then analyzes policies parameters to encounter that the barring indicator is set for IMPI-2 and the locking indicator is set for IMPI-3, so that the policies for none of these IMPI's allow the call to progress. Apart from that, the IP address for the user is not valid since the user had not previously been authenticated. Consequently, with this exemplary set of policies, and without needs for any priority indications since the different policies are consistent to each other, the checking of policies makes the HSS to determine that the terminating call cannot progress and to return towards the querying I-CSCF 3 an appropriate negative result code, which is not illustrated in any drawing, intended to avoid an interim progress of the call.

However, where the given shared IMPU is IMPU-2 105 and the policies had been originally configured in accordance with preferred values, but updated during operation to become policies 109 as illustrated in FIG. 3B, the HSS 1 or 1a finds out that the given IMPU-2 has the barring indicator set for IMPI-1 and the locking indicator set for IMPI-3, so that the policies for none of these IMPI's allow the call to progress, whilst the given IMPU-2 is neither barred nor locked for IMPI-2, is already marked as 'registered' for IMPI-2 and the user IP address is valid since the subscriber had previously been authenticated. Consequently, with this exemplary set of policies 109, and without needs for any priority indications since the different policies are consistent to each other, the checking of policies makes the HSS to determine that the terminating call may progress for the pair IMPU-2/IMPI-2. In this situation, and since the IMPU-2 had been registered for IMPI-2, the HSS 1 or 1*a* may return during a step S-120 towards the I-CSCF 3 as a result of the query an identifier of an S-CSCF 2 previously assigned for serving the subscriber identified by the IMPU-2.

A similar behaviour may be encountered where the given shared IMPU is IMPU-4 107 and the policies 123 illustrated in FIG. 4B had been configured and not updated yet during operation. The HSS 1 or 1*a* finds out that such given IMPU-4 is marked 'not registered' for IMPI-1, 'unregistered' for IMPI-2, and 'registered' for IMPI-3; and then the HSS analyzes policies parameters to encounter that the barring indicator is set for IMPI-1, and that the IP address assigned for the user is not trusted for IMPI-1 and IMPI-2; so that the policies for IMPI-1 and IMPI-2 do not allow the call to progress, whilst the policies for IMPI-2 and for IMPI-3 do allow such progress. As for the previous case, and since the IMPU-4 had been registered for IMPI-3, the HSS 1 or 1*a* may return during a step S-120 towards the I-CSCF 3 as a result of the query an identifier of an S-CSCF 2 previously assigned for serving the subscriber identified by the IMPU-4.

The I-CSCF 3, receiving as a result of the query the identifier of the S-CSCF 2 previously assigned for serving the subscriber, assigns during a step S-125 said S-CSCF 2 for still serving the subscriber and forwards the received invitation to handle the terminating call towards the S-CSCF 2 during a step S-130. The selected S-CSCF 2, which is already marked at the HSS as assigned for serving the subscriber, still keeps a user profile for the user identified with the given IMPU, which had been downloaded when said given IMPU was initially registered, so that said S-CSCF 2 does not need a further registration in the HSS 1 or 1*a* and can continue serving the subscriber for the current terminating call in accordance with conventional procedures.

To this end, as illustrated in FIG. 6 and FIG. 7, the HSS comprises an accessible storage for storing IMS subscription data for each IMS subscriber, wherein the IMS subscription data includes a number 'n' of IMPI's 101, 102 or 103 and a number 'm' of IMPU's 104, 105, 106 or 107, and wherein at least one given IMPU 105 or 107 is shared amongst more than one IMPI. This accessible storage is arranged for configuring said more than one IMPI sharing the given IMPU with a number of policies 108, 122, 123 to be applied per IMPI on how to progress the terminating call. This HSS also comprises a first receiver 63 for receiving from the I-CSCF 3 the query about a subscriber identified by a given IMPU 105, 107; processing means 50 for determining whether an S-CSCF had previously been assigned for the given IMPU; and a first sender 61 for answering the query towards the I-CSCF with either capabilities required from an assignable S-CSCF, or an identifier of a previously assigned S-CSCF. Moreover, the processing means 50 in this HSS is arranged for determining, amongst said more than one IMPI sharing the given IMPU 105 or 107 at least one IMPI for which the policies allow to progress the terminating call.

In particular, as illustrated in FIG. 7, the accessible storage in the HSS may include an external database 40*a* acting as an HSS back-end shared by a plurality of HSS front-ends, and a memory handler 41 for interfacing with the external database. Alternatively, the accessible storage in the HSS may include an internal memory 40.

Generally speaking, the policies to be applied per IMPI might include any combination of parameters which values might determine whether the terminating call can or not progress. To this end, the accessible storage 40 or 40*a* may be arranged for configuring those IMPI's sharing a given IMPU with a number of policies which, at least partially, may be dynamically updated during operation.

In an embodiment of the invention, as illustrated in FIG. 4A and FIG. 4B, the policies to be applied per IMPI might comprise at least one criterion selected from: whether each IMPI is or not authenticated; whether each assigned IP address is or not trusted; whether each IMPI is or not blocked; and whether each IMPI is or not barred. In another embodiment of the invention, as illustrated in FIG. 3A or FIG. 3B, the policies to be applied per IMPI might comprise at least one criterion selected from: whether each assigned IP address is or not authenticated; whether each IMPI is or not blocked; and whether each IMPI is or not barred. The latter embodiment thus including more compacted criteria than those in the former, and wherein the criterion of whether each assigned IP address is or not authenticated may be understood as compacting the two criteria of whether each IMPI is or not authenticated and whether each assigned IP address is or not trusted as disclosed for the former embodiment.

On the other hand, where the given shared IMPU is IMPU-2 105 and the policies 122 illustrated in FIG. 4A had been configured and not updated yet during operation, the HSS 1 or 1*a* finds out that such given IMPU-2 is marked 'not registered' for IMPI-1, 'unregistered' for IMPI-2, and 'registered' for IMPI-3. Then, the HSS analyzes policies parameters to encounter that the barring indicator is set for IMPI-2, so that the policies for IMPI-2 do not allow the call to progress, whilst the policies for IMPI-1 and for IMPI-3 do allow such progress. In this situation, the HSS cannot make a decision to select a unique pair IMPI/IMPU to progress the call other than arbitrary selecting either IMPI-1/IMPU-2 or IMPI-3/IMPU-2. In this particular example, the only apparent difference on the choice is the registration status of the given IMPU-2, which is 'not registered' for IMPI-1 whereas it is 'registered' for IMPI-3. For the latter, the HSS definitely has an S-CSCF 2 already assigned for serving the subscriber, whereas for the former there is no previously assigned S-CSCF so that the HSS has to return capabilities for selection back to the querying I-CSCF 3.

In order to solve this apparent puzzle, the method may further comprise a step of configuring at the HSS said more than one IMPI sharing the given IMPU with a priority indication usable to set the order in which said more than one IMPI is checked to determine the at least one IMPI for which the policies allow to progress the terminating call. In fact, this configuration may be carried out during the step S-100 of configuring the policies to be applied per IMPI.

In the particular case discussed above, where the exemplary policies 122 illustrated in FIG. 4A applies, the priority indication 130 applicable for IMPI-1 shows a higher priority than the priority indication 132 applicable for IMPI-3. Consequently, the IMPI-1/IMPU-2 pair allows the call to progress, this pair having the highest applicable priority and being thus determined by the HSS as an unambiguous selection for which the terminating call can progress.

Given that the IMPU-2 is marked as 'not registered', the HSS selects the capabilities required from a selectable S-CSCF 2 to be assigned and submits them towards the I-CSCF 3 during a step S-120.

To this end, as illustrated in FIG. 6 and FIG. 7 with due regard to FIG. 3A, FIG. 3B, FIG. 4A and FIG. 4B, the accessible storage 40 or 40*a* of the HSS 1 may be further arranged for configuring those IMPI's 101, 102 or 103 sharing the given IMPU 105 or 107 with a priority indication 116-121 or 130-135 usable to set the order in which said IMPI's are checked in order to determine at least one IMPI for which the policies allow to progress the terminating call. In particular, the accessible storage 40 or 40*a* may be arranged for configuring the priority indications per IMS subscription basis, as illustrated in FIG. 3A, or per shared IMPU basis as illustrated in FIG. 4A and FIG. 4B. In operation, the processing means 50 of this HSS may be further arranged for checking these IMPI's until a first IMPI is found for which the policies allow to progress the call.

Still with reference to the method illustrated in FIG. 5, the I-CSCF 3 selects during a step S-125, taking into consideration the received capabilities, an appropriate S-CSCF 2 for serving the subscriber, and the I-CSCF forwards the received invitation to handle the terminating call towards the selected S-CSCF 2 during a step S-130. The selected S-CSCF registers itself towards the HSS for 1*a* during a step S-135 including an S-CSCF identifier, whilst implicitly requesting a user profile for the subscriber identified by the given IMPU addressed by the terminating call, in this case the IMPU-2 105.

The HSS 1 or 1*a* receiving such registration, stores the S-CSCF identifier and marks it as assigned for serving the subscriber identified by the given IMPU-2. Then, the HSS checks again during a step S-140 the applicable policies for the given IMPU-2 to determine whether any change has occurred that precludes the progress of the call. For example, the policies for the previously selected IMPI-1 might have changed so that a barring indicator is set and, by continuing with a lower priority indication, either a new IMPI might allow to progress the call or none of the IMPI's sharing the given IMPU-2 allows the call to progress in which case, rather than selecting a user profile to be downloaded towards the S-CSCF, the HSS may return a negative result code not illustrated in any drawing and intended to avoid an interim progress of the terminating call.

In this particular case, and assuming that the set of policies 122 has not been updated during operation, the HSS finds out that the policies 124 for the IMPI-1 still allow the call to progress; then, the HSS selects an appropriate user profile for the subscriber identified by the given IMPU-2 105 and download such user profile towards the assigned S-CSCF 2 during the step S-145.

To this end, the HSS 1 or 1*a* may further comprise a second receiver 64 for receiving the registration from the S-CSCF 2 assigned to handle the terminating call, and a second sender 62 for downloading the user profile for the given IMPU-2 105 towards said S-CSCF 2. Moreover, the processing means 50 of this HSS may be arranged for determining amongst those IMPI's sharing the given IMPU-2 105 at least one IMPI 101 for which the policies allow to progress the terminating call, before downloading the user profile towards the S-CSCF.

In an embodiment of the invention, the second sender 62 may be arranged for submitting the at least one IMPI 101 for which the policies 124 allow to progress the terminating call towards the S-CSCF. In this case, the second sender 62 may optionally be arranged for submitting the at least one IMPI towards the S-CSCF along with, or included in, the user profile.

In particular, the HSS 1 or 1*a* may be implemented so that the first and second receivers 63 and 64, or the first and second senders 61 and 62, are a same receiver 65 or sender 60 respectively, or even a unique input/output unit 70.

The S-CSCF stores the user profile received in step S-145 and applies service control during a step S-150. Afterwards, the S-CSCF may continue serving the subscriber in accordance with conventional mechanisms.

The invention may also be practised by a computer program, loadable into an internal memory of a computer with input and output units as well as with a processing unit. This computer program comprises to this end executable code adapted to carry out the above method steps when running in the computer. In particular, the executable code may be recorded in a carrier readable means in a computer.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method of progressing a terminating call in an IP Multimedia Subsystem (IMS), wherein the terminating call addresses a given IMS public identity (IMPU), which is shared amongst more than one IMS private identity (IMPI) of an IMS subscription, the method comprising the steps of:
   at a Home Subscriber Server (HSS), which holds IMS subscriptions for subscribers of the IMS, configuring said more than one IMPI sharing the given IMPU with a number of policies to be applied per IMPI on how to progress the terminating call;
   receiving at the HSS from an Interrogating Call Session Control Function (I-CSCF), which is in charge of selecting a Serving Call Session Control Function (S-CSCF) for handling the terminating call, a query about a subscriber identified by the given IMPU;
   determining at the HSS amongst said more than one IMPI sharing the given IMPU at least one IMPI for which the number of policies allow for progressing the terminating call;
   where the at least one IMPI is found, answering from the HSS to the I-CSCF either capabilities required from an assignable S-CSCF, or an identifier of a previously assigned S-CSCF, or where no IMPI is found for which the number of policies allow for progressing the terminating call, answering from the HSS to the I-CSCF with an error condition to avoid progressing the call;
   receiving at the HSS a registration from a S-CSCF assigned to handle the terminating call; and
   downloading a user profile for the given IMPU from the HSS towards the assigned S-CSCF currently handling the terminating call.

2. The method of claim 1, further comprising a step of submitting the at least one IMPI for which the number of policies allow for progressing the terminating call, from the HSS towards the assigned S-CSCF.

3. The method of claim 2, wherein the at least one IMPI for which the number of policies allow to progress the terminating call, is submitted towards the S-CSCF along with, or included in, the user profile.

4. The method of claim 1, further comprising a step of configuring at the HSS said more than one IMPI sharing the given IMPU with a priority indication usable to set the order in which said more than one IMPI is checked to determine the at least one IMPI for which the number of policies allow for progressing the terminating call.

5. The method of claim 4, wherein the priority indications are configured per IMS subscription basis, or per shared IMPU basis.

6. The method of claim 4, wherein the step of determining at the HSS the at least one IMPI for which the number of policies allow for progressing the terminating call is carried out until a first IMPI is found for which the number of policies allow for progressing the call.

7. The method of claim 1, wherein the number of policies to be applied comprise at least one criterion selected from a group of criteria including:
- whether each IMPI is authenticated;
- whether each assigned IP address is trusted;
- whether each IMPI is blocked; and
- whether each IMPI is barred.

8. The method of claim 1, wherein said more than one IMPI sharing the given IMPU are all the IMPI's of the IMS subscription.

9. The method of claim 1, wherein a subset of the number of policies to be applied is dynamically updated.

10. A Home Subscriber Server (HSS) for holding subscriptions for subscribers of an IP Multimedia Subsystem (IMS), the HSS comprising:
- an accessible storage for storing IMS subscription data for each IMS subscriber, the IMS subscription data including a number 'n' of IMS private identities (IMPIs) and a number 'm' of IMS public identities (IMPUs), wherein a given IMPU is shared amongst more than one IMPI;
- a first receiver for receiving from an Interrogating Call Session Control Function (I-CSCF), which is in charge of selecting a Serving Call Session Control Function (S-CSCF) for handling the terminating call, a query about a subscriber identified by the given IMPU;
- processing means for determining whether an S-CSCF had previously been assigned for the given IMPU;
- a first sender for answering the query towards the I-CSCF with either capabilities required from an assignable S-CSCF, or an identifier of a previously assigned S-CSCF;
- a second receiver for receiving a registration from an S-CSCF assigned to handle the terminating call; and
- a second sender for downloading a user profile for the given IMPU towards said S-CSCF;

wherein:
- the accessible storage is arranged for configuring said more than one IMPI sharing the given IMPU with a number of policies to be applied on how to progress the terminating call;
- the processing means is arranged for determining amongst said more than one IMPI sharing the given IMPU whether at least one IMPI exists for which the number of policies allow for progressing the terminating call, before downloading the user profile towards the S-CSCF; and
- the first sender is arranged for answering the query towards the I-CSCF with an error condition to avoid progressing the call, where no IMPI is found by the processing means for which the number of policies allow for progressing the terminating call.

11. The HSS of claim 10, wherein the first and second receivers, or the first and second senders, are a same receiver or sender respectively, or are combined as an input/output unit.

12. The HSS of claim 10, wherein the second sender is arranged for submitting the at least one IMPI, for which the number of policies allow for progressing the terminating call, towards the S-CSCF.

13. The HSS of claim 12, wherein the second sender is arranged for submitting the at least one IMPI towards the S-CSCF along with, or included in, the user profile.

14. The HSS of claim 10, wherein the accessible storage is arranged for configuring said more than one IMPI sharing the given IMPU with a priority indication usable to set the order in which said more than one IMPI is checked to determine the at least one IMPI for which the number of policies allow for progressing the terminating call.

15. The HSS of claim 14, wherein the accessible storage is arranged for configuring the priority indications per IMS subscription basis.

16. The HSS of claim 14, wherein the accessible storage is arranged for configuring the priority indications per shared IMPU basis.

17. The HSS of claim 14, wherein the processing means is arranged for checking the IMPI's until a first IMPI is found for which the number of policies allow for progressing the call.

18. The HSS of claim 10, wherein the accessible storage is arranged for configuring said more than one IMPI sharing the given IMPU with a number of policies that comprise at least one criterion selected from:
- whether each IMPI is authenticated;
- whether each assigned IP address is trusted;
- whether each IMPI is blocked; and
- whether each IMPI is barred.

19. The HSS of claim 10, wherein the accessible storage includes an external database acting as an HSS back-end shared by a plurality of HSS front-ends, and a memory handler for interfacing with the external database.

* * * * *

UNITED STATES PATENT AND TRADEMARK OFFICE
CERTIFICATE OF CORRECTION

PATENT NO.         : 8,559,419 B2                              Page 1 of 1
APPLICATION NO.    : 12/994977
DATED              : October 15, 2013
INVENTOR(S)        : Belinchon Vergara et al.

It is certified that error appears in the above-identified patent and that said Letters Patent is hereby corrected as shown below:

On the Title Page, in Item (57), under "ABSTRACT", in Column 2, Line 5, delete "and," and insert -- and --, therefor.

On the Title Page, in Item (57), under "ABSTRACT", in Column 2, Lines 6-7, delete "including IMPU with a number of policies." and insert -- including a step of configuring at a HSS these more than one IMPI sharing the given IMPU with a number of policies. --, therefor.

In the Specification:

In Column 2, Line 26, delete "HSS" and insert -- HSS. --, therefor.

In Column 2, Line 48, delete "as" and insert -- has --, therefor.

In Column 11, Line 16, delete "HSS for 1a" and insert -- HSS 1 or 1a --, therefor.

Signed and Sealed this
Eleventh Day of February, 2014

Michelle K. Lee
*Deputy Director of the United States Patent and Trademark Office*